US010680239B2

(12) United States Patent
Okato et al.

(10) Patent No.: US 10,680,239 B2
(45) Date of Patent: Jun. 9, 2020

(54) COATED NICKEL HYDROXIDE POWDER FOR ALKALI SECONDARY BATTERY POSITIVE ELECTRODE ACTIVE MATERIAL AND METHOD OF PRODUCING SAME

(71) Applicant: SUMITOMO METAL MINING CO., LTD., Tokyo (JP)

(72) Inventors: Kazuaki Okato, Ehime (JP); Tomomichi Nihei, Ehime (JP); Hideo Sasaoka, Ehime (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 357 days.

(21) Appl. No.: 14/443,920

(22) PCT Filed: Oct. 24, 2013

(86) PCT No.: PCT/JP2013/078879
§ 371 (c)(1),
(2) Date: May 19, 2015

(87) PCT Pub. No.: WO2014/080719
PCT Pub. Date: May 30, 2014

(65) Prior Publication Data
US 2015/0311511 A1 Oct. 29, 2015

(30) Foreign Application Priority Data

Nov. 20, 2012 (JP) .................. 2012-254506

(51) Int. Cl.
| H01M 4/36 | (2006.01) |
| H01M 4/52 | (2010.01) |
| H01M 4/26 | (2006.01) |
| H01M 4/32 | (2006.01) |
| H01M 4/04 | (2006.01) |
| H01M 10/30 | (2006.01) |
| H01M 4/02 | (2006.01) |

(52) U.S. Cl.
CPC ......... H01M 4/366 (2013.01); H01M 4/0402 (2013.01); H01M 4/26 (2013.01); H01M 4/32 (2013.01); H01M 4/52 (2013.01); H01M 10/30 (2013.01); H01M 2004/028 (2013.01)

(58) Field of Classification Search
CPC ...... H01M 4/366; H01M 4/0402; H01M 4/26; H01M 4/32; H01M 4/52; H01M 10/30; H01M 2004/028; Y02E 60/124
See application file for complete search history.

(56) References Cited

U.S. PATENT DOCUMENTS

| 4,224,392 A * | 9/1980 | Oswin ............. H01M 4/64 429/206 |
| 4,728,586 A * | 3/1988 | Venkatesan ......... C01B 3/0031 420/900 |
| 5,180,574 A * | 1/1993 | Von Sacken ........ C01B 6/246 423/594.4 |
| 5,264,201 A * | 11/1993 | Dahn ............... H01M 4/485 252/519.1 |
| 6,083,642 A * | 7/2000 | Kato ................ C01G 51/04 423/594.6 |
| 6,368,748 B1 * | 4/2002 | Takee .............. H01M 4/32 429/206 |
| 6,800,396 B1 * | 10/2004 | Stoller ............. H01M 4/52 423/142 |
| 2001/0015243 A1 * | 8/2001 | Shima .............. C01B 3/0047 148/565 |
| 2002/0172758 A1 * | 11/2002 | Nanno .............. H01M 4/26 427/126.6 |
| 2004/0209166 A1 * | 10/2004 | Kihara ............. C01B 3/0057 429/218.2 |
| 2008/0318125 A1 * | 12/2008 | Sakamoto .......... H01M 4/32 429/223 |

(Continued)

FOREIGN PATENT DOCUMENTS

| CN | 101106193 | 1/2008 |
| JP | 63152866 | 6/1988 |
| JP | 07133115 | 5/1995 |

(Continued)

OTHER PUBLICATIONS

English machine translation of Kousuke et al. (JP 09147857 A) (Year: 1997).*

(Continued)

*Primary Examiner* — Stewart A Fraser
(74) *Attorney, Agent, or Firm* — Dykema Gossett PLLC

(57) ABSTRACT

A coated nickel hydroxide powder that has improved dispersibility in a paste to inhibit agglomeration and can be densely packed in a three-dimensional metal porous body in the preparation of a positive electrode for alkaline secondary battery includes nickel hydroxide particles having a coating layer made of a cobalt compound formed on a surface of the nickel hydroxide particles, wherein when 10 mL of water is added to 10 g of the coated nickel hydroxide powder to prepare a suspension, the suspension has a pH of 10.2 or higher (as measured at 25° C.). The coated nickel hydroxide powder obtained through a crystallization step and a coating step is washed in a washing step until an amount of ammonium ions eluted into a suspension obtained by adding 10 mL of water to 10 g of the coated nickel hydroxide powder becomes 0.35 mmol/L or less.

4 Claims, No Drawings

(56) References Cited

U.S. PATENT DOCUMENTS

2011/0033750 A1* 2/2011 Hosokawa ........... C01G 53/006
 429/223
2015/0311523 A1* 10/2015 Okato ..................... H01M 4/52
 429/223

FOREIGN PATENT DOCUMENTS

| | | |
|---|---|---|
| JP | 07245104 | 9/1995 |
| JP | 08203522 A * | 8/1996 |
| JP | 09147857 A * | 6/1997 |
| JP | 10012237 | 1/1998 |
| JP | 10302788 | 11/1998 |
| JP | 2000149941 | 5/2000 |
| JP | 2004071304 | 3/2004 |
| JP | 2006100154 | 4/2006 |
| JP | 2009238447 | 10/2009 |
| JP | 2011233423 | 11/2011 |
| JP | 2012091955 | 5/2012 |

OTHER PUBLICATIONS

English machine translation of Yamawaki et al. (JP 08203522 A) (Year: 1996).*
English Abstract of JP 63152866.
English Abstract of JP 07133115.
English Abstract of JP 07245104.
English Abstract of JP 10012237.
English Abstract of JP 10302788.
English Abstract of JP 2000149941.
English Abstract of JP 2004071304.
English Abstract of JP 2006100154.
English Abstract of JP 2009238447.
English Abstract of JP 2011233423.
English Abstract of JP 2012091955.
English Abstract of CN101106193.

* cited by examiner

COATED NICKEL HYDROXIDE POWDER FOR ALKALI SECONDARY BATTERY POSITIVE ELECTRODE ACTIVE MATERIAL AND METHOD OF PRODUCING SAME

TECHNICAL FIELD

The present invention relates to a nickel hydroxide powder for an alkaline secondary battery positive electrode active material and a method for producing such a nickel hydroxide powder. Particularly, the present invention relates to a nickel hydroxide powder coated with a cobalt compound to ensure conductivity between particles thereof and enhance the utilization ratio, lifetime characteristics, and output characteristics of a battery, and a method for producing such a coated nickel hydroxide powder.

BACKGROUND ART

In recent years, there has been increasing demand for secondary batteries for portable devices or hybrid cars, and such secondary batteries have been strongly required to have a higher capacity. Therefore, a nickel hydroxide powder for a positive electrode material of alkaline secondary battery has been improved by forming a solid solution with cobalt to improve the utilization ratio of an alkaline secondary battery at high temperatures or by forming a solid solution with zinc or magnesium to improve the lifetime characteristics of an alkaline secondary battery.

Particularly, alkaline secondary batteries used as high-output power sources such as power sources for hybrid cars have been strongly required to have not only such improved utilization ratio at high temperatures or lifetime characteristics but also improved output characteristics. However, a nickel hydroxide powder for a positive electrode material of alkaline secondary battery is an electrical insulating material and poor in conductivity, which causes a problem that an electrical current does not sufficiently run through nickel hydroxide; therefore, the electrochemical availability of nickel hydroxide is low.

In order to solve such a problem, a surface of nickel hydroxide particles is coated with a cobalt compound, such as cobalt oxide or cobalt hydroxide, as a conductive material to ensure conductivity between the nickel hydroxide particles. The cobalt compound that coats the surface of the nickel hydroxide particles develops electrical conductivity and forms a conductive network between the nickel hydroxide particles.

For example, Patent Literature 1 proposes a nickel active material for storage battery mainly including nickel hydroxide particles having a β-type cobalt hydroxide thin layer formed thereon. Patent Literature 1 states that this nickel active material is obtained by depositing nickel hydroxide particles from a nickel salt in an aqueous alkali solution, immersing the nickel hydroxide particles in an aqueous solution of cobalt sulfate or cobalt nitrate, and neutralizing the aqueous solution with an aqueous alkali solution.

Further, Patent Literature 2 describes a method for producing a nickel hydroxide powder coated with cobalt hydroxide, in which a cobalt-containing aqueous solution and an ammonium ion supplier are simultaneously, continuously, and quantitatively supplied to a nickel hydroxide powder-containing aqueous solution adjusted to pH 11 to 13 with a caustic alkali.

Further, Patent Literature 3 proposes a method in which a cobalt ion-containing aqueous solution is supplied to a suspension of a raw nickel hydroxide powder at a supply rate of 0.7 g/min or less in terms of cobalt per kilogram of the raw nickel hydroxide powder, and an ammonium ion-containing aqueous solution is supplied to the suspension to achieve a nickel ion concentration of 10 to 50 mg/L and a cobalt ion concentration of 5 to 40 mg/L while the pH, temperature, and ammonium ion concentration of the suspension are kept at predetermined values.

A positive electrode for alkaline secondary battery using the cobalt compound-coated nickel hydroxide powder described above is generally produced through the steps of mixing a nickel hydroxide powder, an organic polymer as a binder, and a solvent to prepare a paste, packing the paste in a three-dimensional metal porous body, such as foamed nickel, and subjecting the three-dimensional metal porous body to drying and pressing. However, the cobalt compound-coated nickel hydroxide powder is generally poor in dispersibility in the paste; therefore, there is a problem that the packing density of the cobalt compound-coated nickel hydroxide powder in foamed nickel or the like in the preparation of a positive electrode is reduced so that a battery using the positive electrode cannot exhibit desired battery characteristics.

In order to solve such a problem, an increase in the tap density of a nickel hydroxide powder as a core material has been studied. This is because it is generally known that when the tap density of a nickel hydroxide powder is higher, the nickel hydroxide powder can be more densely packed; therefore, the capacity of a battery is expected to increase. For example, Patent Literature 4 states that nickel hydroxide particles having an increased diameter can be crystallized out by simultaneously and continuously supplying a nickel-containing aqueous solution, an aqueous caustic alkali solution, and an ammonium ion supplier, which makes it possible to obtain a nickel hydroxide powder having a high tap density of 2.1 to 2.3 g/mL. Further, Patent Literature 5 describes a high-density nickel hydroxide powder having a tap density of 1.9 g/ml, or more and an average particle size of 3 to 25 μm.

As described above, some proposals have been made to increase the tap density of a cobalt compound-coated nickel hydroxide powder to achieve high-density packing of the powder. However, there has been no proposal effective at improving the dispersibility of a cobalt compound-coated nickel hydroxide powder in a paste. Therefore, there is still a problem that the packing density of a cobalt compound-coated nickel hydroxide powder in foamed nickel or the like in positive electrode preparation has not yet reached a satisfactory level.

CITATION LIST

Patent Literatures

Patent Literature 1: JP 63-152866 A
Patent Literature 2: JP 07-133115 A
Patent Literature 3 JP 2000-149941 A
Patent Literature 4 JP 07-245104 A
Patent Literature 5: JP 10-012237 A

SUMMARY OF INVENTION

Technical Problem

In view of the above conventional problems, it is an object of the present invention to provide a coated nickel hydroxide powder that has improved dispersibility in a paste and can be densely packed in a three-dimensional metal porous body such as foamed nickel in the preparation of a positive electrode for alkaline secondary battery, and a method for producing such a coated nickel hydroxide powder.

Solution to Problem

In order to achieve the above object, the present inventors have intensively studied to find out a reason for agglomeration of a coated nickel hydroxide powder during paste preparation which causes a reduction in the dispersibility of the powder. As a result, the present inventors have found that the occurrence of agglomeration of a coated nickel hydroxide powder is greatly influenced by the pH of a suspension obtained by dispersing the coated nickel hydroxide powder in water as a solvent. Further, the present inventors have found that the pH of the suspension can be controlled by reducing ammonium ions contained in the coated nickel hydroxide powder by controlling washing conditions in the process of producing the coated nickel hydroxide powder. These findings have led to the completion of the present invention.

More specifically, the present invention is directed to a coated nickel hydroxide powder for an alkaline secondary battery positive electrode active material, including; core particles made of nickel hydroxide; and a coating layer made of a cobalt compound and formed on a surface of the core particles, wherein when 10 mL of water is added to 10 g of the coated nickel hydroxide powder to prepare a suspension, the suspension has a pH of 10.2 or higher as measured at 25° C.

In the coated nickel hydroxide powder for an alkaline secondary battery positive electrode active material according to the present invention, a total amount of eluted nitrate ions and nitrite ions in the suspension is preferably 0.60 mmol/L or less, or an amount of eluted nitrate ions in the suspension is preferably 0.52 mmol/L or less. Further, when 10 mL of water is added to 1 g of the coated nickel hydroxide powder to prepare a suspension and then the suspension is allowed to stand for 10 minutes to obtain a supernatant, the supernatant preferably has a turbidity specified in JIS K0101 of 300 degrees or more.

The present invention is directed also to a method for producing a coated nickel hydroxide powder for an alkaline secondary battery positive electrode active material, the method including: a crystallization step in which an aqueous alkali solution is supplied to a nickel-containing aqueous solution to obtain nickel hydroxide particles crystallized out by neutralization as core particles; a coating step in which a coating layer made of a cobalt compound is formed on a surface of the core particles to obtain a coated nickel hydroxide powder; a washing step in which the coated nickel hydroxide powder is washed; and a drying step in which the coated nickel hydroxide powder after washing is dried, wherein in the washing step, the coated nickel hydroxide powder is washed until an amount of ammonium ions eluted into a suspension obtained by adding 10 mL of water to 10 g of the coated nickel hydroxide powder becomes 0.35 mmol/L or less.

In the method for producing a coated nickel hydroxide powder for an alkaline secondary battery positive electrode active material according to the present invention, in the washing step, the coated nickel hydroxide powder is preferably washed with water in an amount of 4 times by mass or more an amount of the coated nickel hydroxide powder. Further, in the washing step, the coated nickel hydroxide powder is preferably washed until an amount of ammonium ions eluted into a suspension obtained by adding 10 mL of water to 10 g of the coated nickel hydroxide powder becomes 0.5 mmol/L or less, and in the drying step, the coated nickel hydroxide powder is preferably dried in a non-oxidizing atmosphere. Further, in the drying step, a partial pressure of a carbon-containing gas in the non-oxidizing atmosphere is preferably 15 Pa or less.

Advantageous Effect of Invention

According to the present invention, pH can be controlled during preparation of a paste using a coated nickel hydroxide powder, which makes it possible to inhibit the occurrence of agglomeration of the coated nickel hydroxide powder. Therefore, when a positive electrode for alkaline secondary battery is prepared using the coated nickel hydroxide powder according to the present invention, the coated nickel hydroxide powder can be uniformly packed in a three-dimensional metal porous body such as foamed nickel, which makes it possible to achieve high-density packing and improve the battery characteristics, such as discharge capacity, of a battery.

DESCRIPTION OF EMBODIMENTS

An important requirement for the packing property of a coated nickel hydroxide powder in a three-dimensional metal porous body, such as foamed nickel, is the dispersibility of particles of the powder in a paste obtained by mixing the coated nickel hydroxide powder, a solvent, and an organic polymer as a binder. More specifically, when poor in dispersibility, the paste is in a state where the powder agglomerates and forms lumps. If the paste in such a state is packed in foamed nickel or the like, it is difficult to achieve uniform packing. As a result, a positive electrode for alkaline secondary battery prepared by packing the coated nickel hydroxide powder in foamed nickel or the like has a low packing density.

In general, factors that influence the dispersibility of particles in a paste are, for example, the particle size, specific surface area, and crystallinity of the particles. However, the dispersibility of a coated nickel hydroxide powder is greatly influenced by pH. The agglomeration of a coated nickel hydroxide powder in a solvent is influenced by the electric potential, such as zeta potential, of particles of the powder, and the electric potential is controlled by the pH of the solvent in which the coated nickel hydroxide powder is dispersed. Therefore, the agglomeration of a coated nickel hydroxide powder in a solvent used for preparing a paste can be inhibited by properly controlling the pH of the solvent.

A coated nickel hydroxide powder according to the present invention includes: core particles made of nickel hydroxide; and a coating layer made of a cobalt compound, wherein when 10 mL, of water is added to 10 g of the coated nickel hydroxide powder to prepare a suspension, the suspension has a pH of 10.2 or higher as measured at 25° C. In general, a water-based paste is often used for producing an alkaline secondary battery. Therefore, the agglomeration of a coated nickel hydroxide powder in a water-based paste generally used can be inhibited by using a coated nickel hydroxide powder such that, when 10 mL of water is added to 10 g of the coated nickel hydroxide powder to prepare a suspension, the suspension has a pH of 10.2 or higher, preferably 10.3 or higher, more preferably 10.8 or higher, even more preferably 10.9 or higher as measured at 25° C.

The initial value of pH of a paste changes depending on the ratio between a coated nickel hydroxide powder and a solvent. However, when the paste has a composition within a range usually used and a coated nickel hydroxide powder whose suspension has a pH in the above range is used, the pH of the paste becomes stable at a value at which the agglomeration of particles of the powder is inhibited; therefore, the agglomeration of the particles is inhibited and the paste can have excellent dispersibility. It is to be noted that the pH of the suspension fluctuates just after the suspension is prepared, but the pH of the suspension or the amount of elution becomes stable after a lapse of 1 minute or longer. Therefore, the pH of the suspension of a coated nickel hydroxide powder is preferably measured after the coated nickel hydroxide powder and water are mixed and stirred for 1 minute or longer. However, the pH of the suspension or the amount of elution is not changed even when the stirring is performed for 10 minutes or longer; therefore, less than ten minutes of stirring is enough.

If the pH of the suspension is less than 10.2, the dispersibility of the coated nickel hydroxide powder in a paste is reduced due to agglomeration; therefore, the packing density of the coated nickel hydroxide powder in foamed nickel or the like is reduced so that the capacity of a battery is reduced. When the pH of the suspension is 10.2 or higher, agglomeration of the coated nickel hydroxide powder can be satisfactorily inhibited. However, when the suspension is highly alkaline, there is a case where the decomposition of an organic material added as a binder to a paste becomes a problem. Particularly, if the pH of the suspension exceeds 13, there is a fear that when a paste is prepared, the decomposition of a binder is promoted. For this reason, the pH of the suspension is preferably 13 or less.

Further, the pH of the suspension is influenced by the amount of ions eluted from the coated nickel hydroxide powder into the suspension. Particularly, the coated nickel hydroxide powder contains ammonium ions used in its production process, and the ammonium ions are oxidized in the production process to nitrogen oxide ions such as nitrate ions or nitrite ions. These nitrogen oxide ions are acidic in water; therefore, reduce the pH of the suspension.

For this reason, in order to control the pH of the suspension to be 10.2 or higher, the amount of nitrogen oxide ions eluted into the suspension, especially the total amount of influential nitrate ions and nitrite ions eluted into the suspension is preferably 0.60 mmol/L or less, more preferably 0.45 mmol/L or less, even more preferably 0.40 mmol/L or less. Particularly, the amount of influential nitrate ions eluted into the suspension is preferably 0.52 mmol/L or less, more preferably 0.40 mmol/L or less, even more preferably 0.35 mmol/L or less. If the total amount of eluted nitrate ions and nitrite ions exceeds 0.60 mmol/L, there is a case where the pH of the suspension is less than 10.2. By reducing the amount of eluted nitrate ions or nitrite ions to the above range, the pH of the suspension can be stably controlled to be 10.2 or higher. It is to be noted that the amount of elution is also preferably evaluated after the suspension becomes stable as in the case of the measurement of the pH of the suspension.

When poor in dispersibility, particles agglomerate in a solvent; therefore, turbidity is reduced due to the high settleability of the particles. For this reason, the turbidity of the suspension is used as an indicator of agglomeration of the coated nickel hydroxide powder in a paste. It has been confirmed that when the turbidity of a suspension obtained by suspending the coated nickel hydroxide powder in water used as a solvent in paste preparation is higher, agglomeration of the coated nickel hydroxide powder in a paste is more inhibited, and the coated nickel hydroxide powder can be more uniformly packed in foamed nickel or the like; therefore, a positive electrode having a higher packing density can be obtained. More specifically, when 10 mL of water is added to 1 g of the coated nickel hydroxide powder to prepare a suspension, and the suspension is allowed to stand for 10 minutes to obtain a supernatant, the turbidity (specified in JIS K0101) of the supernatant is preferably 300 degrees or more, more preferably 350 degrees or more, even more preferably 400 degrees or more. If the turbidity of the suspension is less than 300 degrees, the coated nickel hydroxide powder agglomerates in a paste; therefore, the packing density of a positive electrode is likely to be inadequate.

Further, the total carbon content of the coated nickel hydroxide powder according to the present invention is preferably 1000 ppm by mass or less, more preferably 800 ppm by mass or less, even more preferably 300 ppm by mass or less. The total carbon content is an indicator of carbonation. If the coated nickel hydroxide powder is carbonated, there is a case where a reduction in pH is caused because carbonic acid itself is an acid. If the total carbon content exceeds 1000 ppm by mass, there is a case where the pH of the suspension of the coated nickel hydroxide powder is less than 10.2; therefore, a positive electrode having a high packing density cannot be obtained in the production of a battery.

The coated nickel hydroxide powder according to the present invention is produced by a production method that will be described later so that its dispersibility in a paste is improved. Factors other than such improved dispersibility, such as the composition of nickel hydroxide constituting the core particles and the cobalt compound constituting the coating layer, and the particle size of the coated nickel hydroxide powder, may be in accordance with a conventionally-known coated nickel hydroxide powder.

The core particles of the coated nickel hydroxide powder may be nickel hydroxide particles known for an alkaline secondary battery positive electrode active material, but are particularly preferably made of nickel hydroxide represented by the following general formula: $Ni_{1-x-y}Co_xM_y(OH)_2$ (wherein x is 0.005 to 0.05, y is 0.005 to 0.05, and M is one or more of Ca, Mg, and Zn).

If x that represents a cobalt content in the above formula is less than 0.005, the effect of improving charge efficiency achieved by adding cobalt cannot be obtained. On the other hand, if x exceeds 0.05, battery performance is degraded due to a reduction in discharge voltage. If y that represents the amount of M contained as an additive element is less than 0.005, the effect of reducing a change in the volume of nickel hydroxide during discharge and charge achieved by adding the element M cannot be obtained. On the other hand, if y exceeds 0.05, the effect of reducing a change in the volume of nickel hydroxide can be obtained, but beyond that, a reduction in battery capacity is caused so that battery performance is undesirably degraded.

The cobalt compound that coats the surface of the nickel hydroxide particles of the coated nickel hydroxide powder is preferably cobalt hydroxide, cobalt oxyhydroxide, or a mixture thereof. By coating the nickel hydroxide particles with such a cobalt compound, electrical conductivity is developed between the particles; therefore, the electrochemical availability of nickel hydroxide can be increased.

The amount of cobalt contained in the coating layer of the coated nickel hydroxide powder is preferably in the range of 3 to 7 mass % with respect to the total mass of the nickel hydroxide particles as core particles and the coating layer. If the amount of cobalt contained in the coating layer is less than 3 mass %, the effect of coating the cobalt hydroxide particles is not sufficiently obtained due to the shortage of the amount of the cobalt compound constituting the coating layer. On the other hand, if the amount of cobalt contained in the coating layer exceeds 7 mass %, the amount of the cobalt compound constituting the coating layer is increased, but the coating effect is not further enhanced.

Further, the average particle size, that is, the median diameter at 50% cumulative volume of the coated nickel hydroxide powder as measured by a laser diffraction scattering method is preferably 5 to 15 µm, more preferably 6 to 12 µm. If the average diameter is less than 5 µm, there is a case where the packing density of the coated nickel hydroxide powder in a positive electrode is reduced. If the average diameter exceeds 15 there is a case where the electrochemical availability of nickel hydroxide in a battery is reduced. Further, the particles of the coated nickel hydroxide powder preferably have an almost spherical shape to improve the packing density of the coated nickel hydroxide powder.

Hereinbelow, a method for producing a coated nickel hydroxide powder for an alkaline secondary battery positive electrode active material according to the present invention will be described. The method for producing a coated nickel hydroxide powder according to the present invention includes a crystallization step in which an aqueous solution containing an ammonium ion supplier and an aqueous alkali solution are supplied to a nickel-containing aqueous solution to obtain nickel hydroxide particles crystallized out by neutralization as core particles; a coating step in which a coating layer made of a cobalt compound is formed on a surface of the core particles to obtain a coated nickel hydroxide powder; a washing step in which the coated nickel hydroxide powder is washed; and a drying step in which the coated nickel hydroxide powder after washing is dried.

The nickel-containing aqueous solution used in the crystallization step is preferably an aqueous nickel sulfate solution to prevent impurity incorporation. When an additive element is added to improve battery characteristics, an aqueous solution containing the additive element may be mixed with the nickel-containing aqueous solution. From the viewpoint of inhibiting impurity incorporation and cost, the aqueous alkali solution used is preferably an aqueous sodium hydroxide solution.

In the crystallization step, the aqueous solution containing an ammonium ion supplier is added to form an ammine complex during a neutralization reaction to stabilize the neutralization reaction and to improve the powder characteristics, such as particle size distribution and density, of nickel hydroxide particles to be crystallized out. If the aqueous solution containing an ammonium ion supplier is not added, there is a case where particles having excellent packing property cannot be obtained due to a reduction in sphericity and a wide particle size distribution. The ammonium ion supplier is not particularly limited as long as a nickel ammine complex can be formed in an aqueous reaction solution. Examples of such an ammonium ion supplier include ammonia, ammonium sulfate, ammonium chloride, ammonium carbonate, and ammonium fluoride. Among them, ammonia is preferably used.

The amount of ammonia added as the ammonium ion supplier is not particularly limited as long as it is enough to form a complex by binding with a metal ion such as a nickel ion in an aqueous reaction solution; therefore, the concentration of ammonia in the aqueous reaction solution is preferably 5 to 20 g/L, more preferably 8 to 15 g/L. If the concentration of ammonia in the aqueous reaction solution is less than 5 g/L, the nickel hydroxide particles have a wide particle size distribution or have too small a particle size due to the low solubility of the metal ion that forms a complex. On the other hand, if the concentration of ammonia in the aqueous reaction solution exceeds 20 g/L, there is a case where nickel remains in the liquid component of a slurry due to too high solubility of the metal ion; therefore, the loss of raw materials is large. Further, when an additive element is added, there is a case where the composition ratio between nickel and the additive element shifts.

The pH of the aqueous reaction solution during crystallization caused by neutralization is preferably controlled to be kept in the range of 10 to 13, more preferably 10.5 to 12.5 as measured at 25° C. If the pH is less than 10, particles having a large particle size are easily obtained, but there is a case where nickel remains in the liquid component of a slurry after crystallization. If the pH exceeds 13, the crystallization rate of nickel hydroxide is too high, which is not preferred because many microparticles of nickel hydroxide are formed or the nickel hydroxide particles have an undesirable particle size distribution.

In the crystallization step, the aqueous alkali solution and the aqueous solution containing an ammonium ion supplier may be added to the nickel-containing aqueous solution at a time. However, in order to obtain nickel hydroxide particles having excellent powder characteristics, the nickel-containing aqueous solution, the aqueous alkali solution, and the aqueous solution containing an ammonium ion supplier are preferably supplied to a liquid, in which a reaction is proceeding, little by little to cause crystallization by neutralization. A mixture of the nickel-containing aqueous solution and the aqueous solution containing an ammonium ion supplier may be added, but there is a case where nickel hydroxide particles are generated in the mixture due to an increase in pH. For this reason, the nickel-containing aqueous solution, the aqueous solution containing an ammonium ion supplier, and the aqueous alkali solution are preferably individually supplied to a liquid in which a reaction is proceeding.

As a device used in the crystallization step, a commonly-used crystallization reaction tank can be used. The reaction tank used may be of either continuous or batch type. The reaction tank used is preferably equipped with a stirring device so that a homogeneous reaction can be performed. Further, the reaction tank used more preferably includes the capability of temperature control because temperature control is preferably performed to stabilize a neutralization reaction.

In the next coating step, a coating layer made of a cobalt compound is formed on the surface of particles of the nickel hydroxide powder obtained in the crystallization step. More specifically, an aqueous cobalt salt solution and an aqueous alkali solution are supplied to a stirred slurry of the nickel hydroxide particles as core particles while the pH of the slurry is kept in the range of 8 to 11.5 as measured at 25° C. so that the surface of the nickel hydroxide particles is coated with cobalt hydroxide crystallized out by neutralization. In this way, a coated nickel hydroxide powder is obtained whose particle surface is coated with cobalt hydroxide.

If the pH of the slurry is less than 8, the deposition rate of cobalt hydroxide is too low; therefore, productivity is reduced. On the other hand, if the pH of the slurry exceeds 11.5, cobalt hydroxide is likely to gelate; therefore, it is difficult to form an excellent coating. It is to be noted that the pH of the slurry of the nickel hydroxide powder is preferably adjusted to a value in the above range with an inorganic acid including a cation contained in a cobalt salt supplied so as not to exceed 11.5. Further, the pH of the slurry is more preferably kept in the range of 9.5 to 10.5.

Further, the pH of the slurry is preferably kept at a certain value in the above range of 8 to 11.5 and controlled so that its fluctuation range is within ±0.2. If the fluctuation range of the pH exceeds the above limit, there is a fear that the amount of a cobalt hydroxide coating varies. It is to be noted that the pH of the slurry is continuously measured with, for example, a pH controller using a glass electrode method, and the flow rate of the aqueous alkali solution supplied is preferably continuously feedback-controlled with the pH controller so that the pH is kept constant within the above fluctuation range.

In the coating step, when a region of high cobalt salt concentration is formed or a rapid increase in pH occurs in a portion where the aqueous cobalt salt solution is supplied to the slurry, cobalt hydroxide is likely to be deposited alone. As a result, cobalt hydroxide is started to be deposited alone even when the nickel hydroxide particles are not present near the cobalt hydroxide; therefore, cobalt hydroxide poor in adhesiveness and uniformity is likely to be deposited on the surface of the nickel hydroxide particles. In order to inhibit this, the deposition of cobalt hydroxide alone is preferably inhibited by appropriately adjusting the stirring conditions of the slurry or adjusting the distance between a supply port for the aqueous cobalt salt solution and a supply port for the aqueous alkali solution.

The concentration of nickel hydroxide in the slurry is preferably in the range of 400 to 1200 g/L. If the concentration of nickel hydroxide is less than 400 g L, there is a case where cobalt hydroxide is deposited alone in the slurry due to the shortage of surface active sites of the nickel hydroxide particles where deposition of cobalt hydroxide occurs. On the other hand, if the concentration of nickel hydroxide exceeds 1200 g/L, there is a case where the slurry cannot be sufficiently stirred due to an increase in viscosity so that a cobalt hydroxide coating is non-uniformly formed.

The cobalt salt is not particularly limited as long as the cobalt salt is a water-soluble cobalt compound from which cobalt hydroxide is generated by pH control. More specifically, the cobalt salt is preferably cobalt sulfate or cobalt chloride, and is more preferably cobalt sulfate not contaminated with halogens. The alkali is not particularly limited, but is preferably water-soluble sodium hydroxide or potassium hydroxide. From the viewpoint of cost, sodium hydroxide is particularly preferred.

The temperature of the slurry is preferably in the range of 30 to 60° C. before and after the aqueous cobalt salt solution and the aqueous alkali solution are added. If the temperature of the slurry is less than 30° C., cobalt hydroxide is slowly deposited due to a low reaction rate. On the other hand, if the temperature of the slurry exceeds 60° C., cobalt hydroxide is likely to be non-uniformly deposited on the surface of the nickel hydroxide particles due to too high a reaction rate. Further, the temperature of the slurry is preferably kept at a certain value within the above temperature range and controlled so that its fluctuation range is within ±1° C. If the fluctuation range of the temperature of the slurry exceeds the above limit, there is a fear that the concentration of impurities in deposited cobalt hydroxide varies so that a battery using a resulting coated nickel hydroxide powder does not have stable characteristics.

In the coating step, a coated nickel hydroxide powder is obtained whose particles have a uniform cobalt hydroxide coating layer tightly adhering to the surface thereof. Further, after the surface of particles of the nickel hydroxide powder is coated with cobalt hydroxide in the slurry in the coating step, cobalt hydroxide constituting the coating layer may be oxidized to cobalt oxyhydroxide by supplying air or oxygen to the stirred slurry or adding an oxidizer.

The oxidation of the cobalt hydroxide coating layer and the coating of the nickel hydroxide particles with cobalt hydroxide may be continuously performed. For example, a first reaction tank (coating tank) in which coating of the nickel hydroxide particles with cobalt hydroxide is performed and a second reaction tank (oxidation tank) in which oxidation of cobalt hydroxide is performed are cascaded, and the slurry containing the coated nickel hydroxide powder coated with cobalt hydroxide in the first reaction tank (coating tank) is continuously supplied to the second reaction tank (oxidation tank) to oxidize cobalt hydroxide so that a coated nickel hydroxide powder coated with cobalt oxyhydroxide can be obtained.

The coated nickel hydroxide powder obtained in the coating step is washed in the next washing step until the amount of ammonium ions eluted into a suspension obtained by adding 10 mL of water to 10 g of the coated nickel hydroxide powder becomes 0.35 mmol/L or less.

By washing the coated nickel hydroxide particles in the washing step until the amount of eluted ammonium ions becomes 0.35 mmol/L or less, it is possible to obtain a coated nickel hydroxide powder such that when 10 mL of water is added to 10 q of the coated nickel hydroxide particles to prepare a suspension, the suspension has a pH of 10.2 or higher as measured at 25° C. This makes it possible to inhibit the agglomeration of the coated nickel hydroxide powder in a paste. Therefore, the coated nickel hydroxide powder can be uniformly packed in foamed nickel or the like so that a positive electrode having a high packing density is obtained in the production of a battery.

More specifically, the ammonium ion supplier added to obtain nickel hydroxide particles excellent as core particles in the crystallization step, in which a nickel hydroxide powder is produced, remains as ammonia in the nickel hydroxide particles; therefore, the ammonia is oxidized to a nitrogen oxide by drying after washing, and then nitrogen oxide ions such as nitrate ions or nitrite ions are eluted into a suspension. The eluted nitrogen oxide ions reduce the pH of the suspension, which causes agglomeration.

The amount of eluted ammonium ions is determined for the coated nickel hydroxide powder; therefore, when the coated nickel hydroxide powder in a wet state is evaluated, the amount of eluted ammonium ions can be accurately measured by adjusting the amount of water added based on the previously-determined water content of the coated nickel hydroxide powder. When the coated nickel hydroxide powder is once dried, drying may be performed under conditions where ammonia is not chemically changed and the ammonia content of the coated nickel hydroxide powder is not changed, for example, in an inert atmosphere at a temperature of about 30° C.

In the washing step, ammonia contained in the coated nickel hydroxide powder before the drying step may be reduced so that the amount of eluted ammonium ions is 0.35 mmol/L or less. It is to be noted that ammonia contained in the coated nickel hydroxide powder is derived from the ammonium ion supplier used in the crystallization step; therefore, removal of ammonia from the core particles by sufficiently washing the nickel hydroxide powder is also preferred from the viewpoint of reducing the ammonia content of the coated nickel hydroxide powder.

On the other hand, it is considered that ammonium ions that are present near the surface of particles of the coated nickel hydroxide powder and are oxidized in the drying step have a great impact on the pH described above. For this reason, from the viewpoint of efficiency, ammonium ions present near the surface of particles of the coated nickel hydroxide powder are preferably removed by washing after the coating step. Therefore, in the production method according to the present invention, the coated nickel hydroxide powder is sufficiently washed in the washing step after the coating step until the amount of eluted ammonium ions is in the above range of 0.35 mmol/L or less. Moreover, as described above, it is preferred that washing of the nickel hydroxide powder is also performed after the crystallization step.

In the washing step, the coated nickel hydroxide powder is preferably washed with water in an amount of 4 times by mass or more, more preferably 5 times by mass or more the amount of the coated nickel hydroxide powder. By washing the coated nickel hydroxide powder with water in an amount of 4 times by mass or more the amount of the coated nickel hydroxide powder, the amount of eluted ammonium ions can be sufficiently reduced. There is no upper limit on the amount of water used for washing performed only for the purpose of reducing the amount of eluted ammonium ions. However, it is useless to use a large amount of water for washing; therefore, from a practical viewpoint the amount of water used for washing is 15 times by mass or less the amount of the coated nickel hydroxide powder. Further, assuming that the amount of water used for washing is the same, washing is preferably performed two or more times from the viewpoint of effectiveness. However, if the amount of water is less than 4 times by mass the amount of the coated nickel hydroxide powder, there is a case where the amount of eluted ammonium ions cannot be reduced to the above range.

A washing method is not particularly limited, as long as impurities such as ammonium ions or sodium can be removed. Examples of such a washing method include batch repulp washing using a stirring tank in which washing water is stirred, washing with water passed through a filter press, or continuous washing using a rotary filter.

Then, in the drying step, the coated nickel hydroxide particles in a wet state after washing are dried to obtain a coated nickel hydroxide powder. As described above, nitrogen oxide ions have a great impact on a reduction in the pH of a suspension of the coated nickel hydroxide powder; therefore, it is important to reduce ammonium ions in the washing step. In addition, it is also important to inhibit oxidation of ammonium ions during drying of the coated nickel hydroxide powder in the drying step.

Therefore, in the drying step, the coated nickel hydroxide powder is preferably dried in a non-oxidizing atmosphere to inhibit oxidation. The non-oxidizing atmosphere is preferably a vacuum or an inert gas atmosphere. It is to be noted that oxidation can be inhibited also by reducing a drying temperature. However, a reduction in drying temperature is not preferred because it takes a long time to complete drying so that productivity is significantly reduced.

When the coated nickel hydroxide powder is dried under conditions where oxidation is inhibited in the drying step, the amount of ammonium ions eluted into a suspension, obtained by adding 10 mL of water to 10 g of the coated nickel hydroxide powder, achieved by washing in the washing step before the drying step may be 0.5 mmol/L or less that is higher than the above range of 0.35 mmol/L or less. Conversion of ammonium ions to nitrogen oxide ions is inhibited by inhibiting oxidation in the drying step; therefore, the total amount of nitrate ions and nitrite ions eluted from the coated nickel hydroxide particles into the suspension is reduced by reducing the amount of eluted ammonium ions to 0.5 mmol/L or less in the washing step so that the suspension can have a pH of 10.2 or higher as measured at 25° C.

Further, in the drying step, the partial pressure of a carbon-containing gas in the non-oxidizing atmosphere is preferably 15 Pa or less. A carbon-containing gas, especially carbon dioxide, is considered to have the function of promoting the elution of nitrogen oxide ions from the coated nickel hydroxide powder due to ion exchange with nitrogen oxide ions attached to the coated nickel hydroxide powder during drying. If the partial pressure of the carbon-containing gas exceeds 15 Pa, the total carbon content of the coated nickel hydroxide powder is increased, which is not preferred because there is a case where the pH of a suspension of the coated nickel hydroxide powder is less than 10.2.

The coated nickel hydroxide powder obtained by the production method according to the present invention is excellent in particle dispersibility; therefore, the occurrence of agglomeration during paste preparation can be inhibited. Thus, the coated nickel hydroxide powder can be uniformly packed in a three-dimensional metal porous body such as foamed nickel in the preparation of a positive electrode for alkaline secondary battery; therefore, a positive electrode having a high packing density can be obtained, which is extremely effective at improving the discharge capacity of an alkaline secondary battery.

EXAMPLES

Hereinbelow, the present invention will be described in more detail with reference to Examples and Comparative Example. It is to be noted that in Examples and Comparative Example, cations in a suspension were analyzed by ICP atomic emission spectrometry, and anions were analyzed by ion chromatography. The turbidity of a suspension was measured in the following manner. Ten milliliters of water was added to 1 g of a coated nickel hydroxide powder to prepare a suspension, and the suspension was allowed to stand for 10 minutes to obtain a supernatant. Then, the turbidity of the supernatant was measured by a method specified in JIS K0101 using kaolin as a reference substance.

Example 1

(Crystallization Step)

Nickel sulfate hexahydrate for industrial use of 134.3 kg, cobalt sulfate heptahydrate for industrial use of 4.6 kg, and magnesium sulfate of 4.0 kg were dissolved in water to prepare a nickel-containing aqueous solution whose total volume was adjusted to 300 L. Further, 100 L of a 48 mass % sodium hydroxide solution for industrial use was diluted with water to prepare an aqueous sodium hydroxide solution having a total volume of 200 L.

Then, a reaction tank having a capacity to overflow of 9 L was filled with water, and was then placed in a constant temperature water bath so that the temperature of the water was adjusted to and kept at 50° C. Further, the nickel-containing aqueous solution and a 25 mass % ammonia water for industrial use were continuously supplied into the reaction tank while the water in the reaction tank was stirred, and the pH (as measured at 25° C.) of a reaction liquid in the reaction tank was controlled to be 11.8 with the aqueous sodium hydroxide solution using a pH controller.

The reaction liquid in the reaction tank was kept stirred until the pH, temperature, ammonium ion concentration, and slurry concentration of the reaction liquid reached certain values, and then a product was collected through an overflow. The collected product was washed with water to remove attached impurities such as anions to obtain a nickel hydroxide powder $(Ni_{0.94}Co_{0.03}Mg_{0.03}(OH)_2)$ as core particles.

(Coating Step)

The obtained nickel hydroxide powder was dispersed in water to prepare a nickel hydroxide slurry containing nickel hydroxide particles at a solid content concentration of 1000 g/L. Further, 4.8 kg of cobalt sulfate heptahydrate for industrial use was dissolved in water to obtain an aqueous cobalt sulfate solution whose total volume was adjusted to 10 L.

The obtained nickel hydroxide slurry was transferred to a reaction tank for coating, and then the reaction tank was placed in a constant temperature water bath so that the temperature of the nickel hydroxide slurry was adjusted to and kept at 50° C. Then, the aqueous cobalt sulfate solution was added to the stirred nickel hydroxide slurry in the reaction tank at 80 mL/min. Further, the aqueous sodium hydroxide solution was supplied to the nickel hydroxide slurry to adjust the pH of the nickel hydroxide slurry to 10.0 as measured at 25° C. Here, the pH of the slurry in the reaction tank was measured with a pH electrode and controlled by adjusting the supply flow rate of the aqueous sodium hydroxide solution using a pH controller. It is to be noted that the accuracy of pH control using the pH controller was ±0.1.

After all the aqueous cobalt sulfate solution was dropped, the pH of the slurry was adjusted to 9.5 as measured at 25° C. Further, air was blown into the stirred slurry from the bottom of the reaction tank for 4 hours to oxidize cobalt hydroxide deposited on the surface of the nickel hydroxide particles to cobalt oxyhydroxide. During the oxidation reaction, the temperature of the slurry in the reaction tank was kept at 50±0.5° C. The slurry after the reaction was subjected to solid-liquid separation, and as a result, 52.0 kg of a nickel hydroxide powder coated with cobalt oxyhydroxide was obtained.

(Washing Step)

The obtained cobalt oxyhydroxide-coated nickel hydroxide powder in a wet state was subjected to repulp washing by 3 repeated cycles of washing performed by dispersion in 120 L of water and filtration. It is to be noted that the amount of water used for the washing was 6.92 times by mass the amount of the cobalt oxyhydroxide-coated nickel hydroxide powder. Ten milliliters of water was added to 10 g of the cobalt oxyhydroxide-coated nickel hydroxide powder after washing to prepare a suspension, and the suspension was stirred for 5 minutes. Then, the amount of eluted ammonium ions was measured and found to be 0.07 mmol/L.

(Drying Step)

Further, the cobalt oxyhydroxide-coated nickel hydroxide powder after washing was dried for 15 hours using a vacuum drier set at 105° C. to obtain a cobalt oxyhydroxide-coated nickel hydroxide powder in a dry state. It is to be noted that the partial pressure of a carbon-containing gas in a vacuum during drying was 5 Pa or less.

Ten milliliters of water was added to 10 g of the obtained cobalt oxyhydroxide-coated nickel hydroxide powder, an the powder was dispersed in the water by stirring for 5 minutes to prepare a suspension. The pH of the suspension was 11.5 as measured at 25° C., and the total amount of eluted nitrate ions and nitrite ions was 0.10 mmol/L. Further, the turbidity of a suspension of the cobalt oxyhydroxide-coated nickel hydroxide powder was measured and was found to be 512 degrees (kaolin). Further, the cobalt oxyhydroxide-coated nickel hydroxide powder had a total carbon content of 220 ppm. The measurement results are shown in the following Table 1.

Example 2

A cobalt oxyhydroxide-coated nickel hydroxide powder was obtained in the same manner as in Example 1 except that in the drying step, drying was performed using a stationary drier in a nitrogen gas atmosphere whose partial pressure of a carbon-containing gas was 5 Pa or less.

A suspension of the obtained cobalt oxyhydroxide-coated nickel hydroxide powder was prepared in the same manner as in Example 1. The pH of the suspension was 11.6, and the total amount of eluted nitrate ions and nitrite ions was 0.12 mmol/L. Further, the turbidity of a suspension of the cobalt oxyhydroxide-coated nickel hydroxide powder was measured and was found to be 483 degrees (kaolin). Further, the cobalt oxyhydroxide-coated nickel hydroxide powder had a total carbon content of 200 ppm. The measurement results are shown in the following Table 1.

Example 3

A cobalt oxyhydroxide-coated nickel hydroxide powder was obtained in the same manner as in Example 1 except that in the drying step, drying was performed using a stationary drier in an air atmosphere.

A suspension of the obtained cobalt oxyhydroxide-coated nickel hydroxide powder was prepared in the same manner as in Example 1. The pH of the suspension was 10.7, and the total amount of eluted nitrate ions and nitrite ions was 0.46 mmol/L. Further, the turbidity of a suspension of the cobalt oxyhydroxide-coated nickel hydroxide powder was measured and was found to be 311 degrees (kaolin). Further, the cobalt oxyhydroxide-coated nickel hydroxide powder had a total carbon content of 980 ppm. The measurement results are shown in the following Table 1.

Example 4

A cobalt oxyhydroxide-coated nickel hydroxide powder was obtained in the same manner as in Example 1 except that in the washing step, repulp washing using 50 L of water was repeated three times. It is to be noted that the amount of water used for washing was 2.88 times by mass the amount of the cobalt oxyhydroxide-coated nickel hydroxide powder.

Ten milliliters of water was added to 10 g of the cobalt oxyhydroxide-coated nickel hydroxide powder after washing to prepare a suspension, and the suspension was stirred for 5 minutes. Then, the amount of eluted ammonium ions was measured and found to be 0.47 mmol/L.

A suspension of the cobalt oxyhydroxide-coated nickel hydroxide powder obtained after drying was prepared in the same manner as in Example 1. The pH of the suspension was 10.8, and the total amount of eluted nitrate and nitrite ions was 0.42 mmol/L. Further, the turbidity of a suspension of the cobalt oxyhydroxide-coated nickel hydroxide powder was measured and was found to be 351 degrees (kaolin). Further, the cobalt oxyhydroxide-coated nickel hydroxide powder had a total carbon content of 310 ppm. The measurement results are shown in the following Table 1.

Comparative Example 1

A cobalt oxyhydroxide-coated nickel hydroxide powder was obtained in the same manner as in Example 1 except that in the washing step, repulp washing using 15 L of water was repeated three times and that in the drying step, drying was performed using a stationary drier in an air atmosphere.

Ten milliliters of water was added to 10 g of the cobalt oxyhydroxide-coated nickel hydroxide powder after washing to prepare a suspension, and the suspension was stirred for 5 minutes. Then, the amount of eluted ammonium ions was measured and found to be 0.53 mmol/L.

A suspension of the obtained cobalt oxyhydroxide-coated nickel hydroxide powder was prepared in the same manner as in Example 1. The pH of the suspension was 9.7, and the total amount of eluted nitrate ions and nitrite ions was 0.67 mmol/L. Further, the turbidity of a suspension of the cobalt oxyhydroxide-coated nickel hydroxide powder was measured and was found to be 196 degrees (kaolin). Further, the cobalt oxyhydroxide-coated nickel hydroxide powder had a total carbon content of 1200 ppm. The measurement results are shown in the following Table 1.

TABLE 1

| | pH of Suspension | Amount of Eluted Ions (mmol/L) | | | Turbidity degrees (kaolin) | Total Carbon Content (ppm by mass) |
|---|---|---|---|---|---|---|
| | | Nitrate Ions | Nitrite Ions | Nitrate Ions + Nitrite Ions | | |
| Example 1 | 11.5 | 0.10 | <Lower Detection Limit | 0.10 | 512 | 220 |
| Example 2 | 11.6 | 0.12 | <Lower Detection Limit | 0.12 | 483 | 200 |
| Example 3 | 10.7 | 0.41 | 0.05 | 0.46 | 311 | 980 |
| Example 4 | 10.8 | 0.36 | 0.06 | 0.42 | 351 | |
| Comparative Example 1 | 9.7 | 0.62 | 0.05 | 0.67 | 196 | 1200 |

As can be seen from the results summarized in Table 1, the turbidity is obviously lower in Comparative Example 1 than in Examples 1 to 4, that is, agglomeration of the cobalt oxyhydroxide-coated nickel hydroxide powder is more likely to occur in Comparative Example 1 than in Examples 1 to 4. The above results of Examples and Comparative Example show that agglomeration of the coated nickel hydroxide powder during paste preparation can be inhibited by washing and drying the coated nickel hydroxide powder so that a suspension of the coated nickel hydroxide powder has a pH of 10.2 or higher.

The invention claimed is:

1. A coated nickel hydroxide powder which has been washed with water until an amount of ammonium ions eluted into a suspension obtained by adding 10 mL of water to 10 g of the coated nickel hydroxide powder becomes 0.35 mmol/L or less and which can be used as a paste for an alkaline secondary battery positive electrode active material, comprising:
  core particles constituting of nickel hydroxide; and
  a coating layer constituting of a cobalt compound including cobalt hydroxide, cobalt oxyhydroxide, or a mixture thereof, formed on a surface of the core particles,
  wherein the coated nickel hydroxide powder has a total carbon content of 800 ppm by mass or less and has a median diameter at 50% cumulative volume of 5 to 15 μm as measured by a laser diffraction scattering method,
  wherein when 10 mL of water is added to 10 g of the coated nickel hydroxide powder to prepare a suspension for evaluation, the suspension has a pH of 10.2 to 13 as measured at 25° C. and a total amount of eluted nitrate ions and nitrite ions in the suspension is 0.60 mmol/L or less,
  and wherein when 10 mL of water is added to 1 g of the coated nickel hydroxide powder to prepare a second suspension and then the second suspension is allowed to stand for 10 minutes to obtain a supernatant, the supernatant has a turbidity specified in JIS K0101 of 350 degrees or more.

2. The coated nickel hydroxide powder for an alkaline secondary battery positive electrode active material according to claim 1, wherein an amount of eluted nitrate ions in the suspension is 0.52 mmol/L or less.

3. A method for producing a coated nickel hydroxide powder which has a median diameter at 50% cumulative volume of 5 to 15 μm as measured by a laser diffraction scattering method and is used as a paste for an alkaline secondary battery positive electrode active material, the method comprising:
  a crystallization step in which an ammonium ion supplier-containing aqueous solution in which the ammonium ion supplier has a capability to form a nickel ammine complex in an aqueous reaction solution and an aqueous alkali solution are supplied to a nickel-containing aqueous solution of an aqueous nickel sulfate solution to obtain nickel hydroxide particles crystallized out by neutralization as core particles;
  a coating step in which an aqueous cobalt salt solution and an aqueous alkali solution are supplied to a stirred slurry of the nickel hydroxide particles as core particles while the pH of the slurry is maintained in a range of 8 to 11.5 as measured at 25° C. and the temperature of the slurry is maintained in a range between 30 to 60° C. so as to form a coating layer made of a cobalt compound on a surface of the core particles to obtain a coated nickel hydroxide powder;
  a washing step in which the coated nickel hydroxide powder is washed with water in an amount of 4 times by mass or more an amount of the coated nickel hydroxide powder; and
  a drying step in which the washed coated nickel hydroxide powder is dried in a non-oxidizing atmosphere of either vacuum or a nitrogen gas atmosphere, the non-oxidizing atmosphere having a partial pressure of a carbon-containing gas being 15 Pa or less such that the coated nickel hydroxide powder has a total carbon content of 800 ppm by mass or less,
  wherein in the washing step, the coated nickel hydroxide powder is washed until an amount of ammonium ions eluted into a suspension obtained by adding 10 mL of water to 10 g of the coated nickel hydroxide powder before the drying step becomes 0.35 mmol/L or less,
  and wherein after the drying step, a total amount of eluted nitrate ions and nitrite ions in a suspension obtained by adding 10 mL of water to 10 g of the coated nickel hydroxide powder after the drying step is 0.60 mmol/L or less.

4. The method for producing a coated nickel hydroxide powder for an alkaline secondary battery positive electrode active material according to claim 3, further comprising an oxidizing step after the coating step, in which at least a part of any cobalt hydroxide constituting the coating layer is oxidized to cobalt oxyhydroxide by supplying air or oxygen to the stirred slurry or adding an oxidizer.

* * * * *